Oct. 14, 1947.    S. G. BURT-WELLS    2,429,090
DISHWASHING MACHINE
Filed Dec. 2, 1943
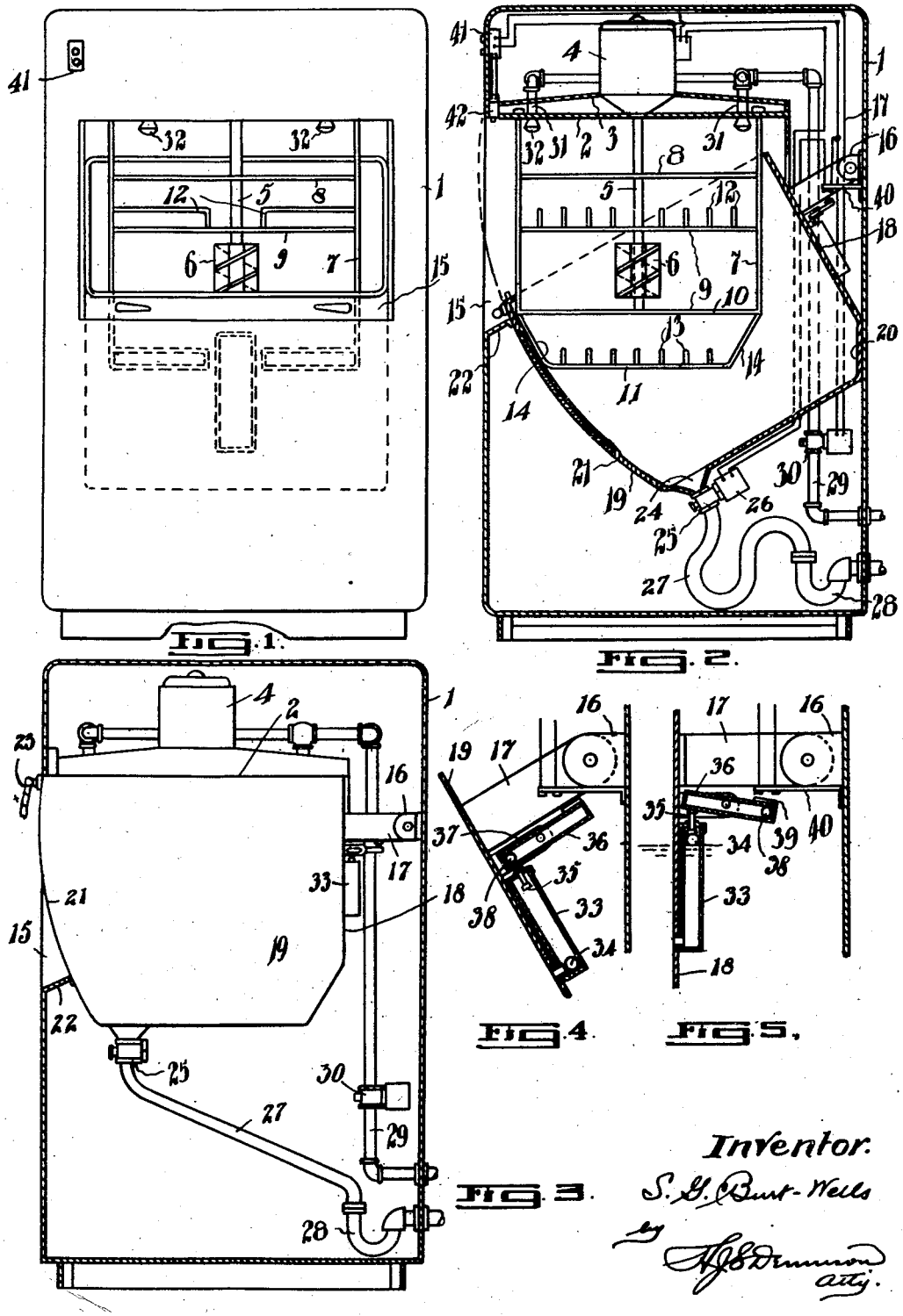

Patented Oct. 14, 1947

2,429,090

UNITED STATES PATENT OFFICE 2,429,090

DISHWASHING MACHINE

Sidney G. Burt-Wells, Toronto, Ontario, Canada, assignor to Triumph Dishwashers Limited, Toronto, Ontario, Canada Application December 2, 1943, Serial No. 512,652

8 Claims. (Cl. 134—57)

1

The principal objects of this invention are to provide a machine for washing dishes which is small and compact and capable of being installed in the ordinary home, and in which the dishes are placed in stationary racks within the machine and are thoroughly washed, rinsed and drained.

A further object is to devise a structure which will be operated automatically following the manual starting to wash, rinse and drain the used water, leaving the dishes ready for removal.

The principal features of the invention consist in the novel construction of the dishwashing cabinet with a rack for holding the dishes rigidly suspended therein, and around which is arranged a pivotally mounted bucket-like receptacle or tank adapted to be swung on a pivotal support to enclose the dish-holding rack, the bucket having an automatically controlled discharge for evacuating the used water.

A further feature of importance consists in the novel construction and arrangement of means for automatically cutting off the motor for agitating the washing water upon the rise of water within the bucket receptacle to a predetermined level, and concurrently opening the discharge from the bucket.

Still further features of importance comprise the automatic control of the inflow of water through the washing compartment and the outflow of waste water following the washing operation.

In the accompanying drawings

Figure 1 is a front elevational view of my improved dishwashing machine.

Figure 2 is a part elevation and vertical sectional view taken from one side of the machine and showing the water or bucket receptacle in the lowered position.

Figure 3 is a part section and elevational view taken from the side of the machine showing the bucket in the raised position enclosing the dish-holding rack.

Figure 4 is an enlarged sectional detail of the water level controlled switch mechanism mounted on the bucket shown in the position illustrated in Figure 2.

Figure 5 is a sectional detail of the water level control switch in the position illustrated in Figure 3 when the water level has been raised to the maximum.

Referring to the accompanying drawings, the outer cabinet 1 of the dish-washing machine is preferably of rectangular form, and arranged within the cabinet and spaced from the top

2 thereof is a horizontal rectangular shield 2, herein shown with a plate 3 spaced thereabove, and within this double plate structure is supported an electric motor 4, the vertical shaft 5 of which extends downwardly into the casing and has mounted on its lower end a spiral-bladed impeller 6.

Rigidly secured to and suspended from the plate 2 is a dish-holding rack 7 which is provided with transverse grid bars 8, 9, 10 and 11, the bars 9 and 11 preferably having raised rack bars 12 and 13 respectively, running transversely to the bars to which they are attached. These raised bars form holding racks for holding plates, etc., in an upright position.

The lower portion of the front and back bars is preferably formed with the bevelled portion 14.

The cabinet 1 is provided with a rectangular opening 15 arranged opposite to the rack 7 through which access is obtained to the rack for the placing and removal of dishes.

Brackets 16 rigidly secured to the inner side of the cabinet 1, opposite the opening 15, form pivotal supports for bracket arms 17 which are rigidly secured to the back wall 18 of a bucket member 19. This bucket member is provided with a bevelled corner 20 which rests against the back wall of the cabinet 1, with the bucket in a downwardly sloping position, as illustrated in Figure 2, enclosing the lower portion of the rack 7.

The front wall 21 of the bucket is curved in arc shape with a radius extending from its pivot support in the brackets 16, and the front lip of the bucket extends slightly above the inturned lip 22 of the opening 15. The bucket is provided with handles 23 connected with suitable locking devices on its upper edge which are adapted to engage co-operating locking devices at the upper edge of the opening 15 when the bucket is swung upwardly on its pivot to a position shown in Figure 3.

A funnel-shaped orifice 24 is arranged at the forward side of the bottom of the bucket 19, and to this orifice is connected a valve 25 which is operated to close by a solenoid device 26. A flexible waste pipe 27 is connected to the valve 25 and leads to a trap outlet 28 for the discharge of the waste water from the bucket.

A water pipe 29, connected with a suitable source of hot water supply, extends within the cabinet 1 and is provided with a valve 30 solenoid-controlled to open. The upper end of the water pipe 29 is suitably branched and extends over the top of the shield plate 3 and is provided with downward extensions 31, which extend below the shield 2 and are provided with suitable spray nozzles 32, which are arranged to spray water downwardly through the rack to flush and clean the dishes placed therein.

The flexible waste pipe 27 permits the bucket to be swung upwardly to the horizontal position illustrated in Figure 3 when the locks carried on the forward edge of the bucket secure the bucket in such position.

The water flowing into the bucket from the spray nozzles engages and flushes the dishes carried in the rack, and the motor 4 is started into operation simultaneously with the closing of the bucket, so that the impeller 6 is rapidly rotated.

The water falling from the spray nozzles is engaged by this rotor and splashed around inside the rack, and as the level of water rises in the bottom of the bucket, this impeller also picks up water from the body of water in the bucket and disperses it with outward and upward thrusting movement.

In operation before the bucket is closed a suitable quantity of a detergent material, such as soap, is thrown into the bucket and this mixes with the water under the agitation created by the joint action of the spray nozzles and the impeller 6, and the dishes become thoroughly cleansed.

It will be noted that the top edge of the bucket engages in sealing contact with the horizontal shield plate 2 so that there will be no leakage of water therefrom in the washing operation.

Mounted on the back wall of the bucket is a tubular float chamber 33 in which is arranged a ball float 34, and the lower end of the float chamber is open to the interior of the bucket so that water within the bucket may flow into the float chamber when it rises to the level of the opening.

A plunger 35 is mounted in the top end of the float chamber 33 and this engages a tubular switch member 36 pivotally mounted on a bracket 37 secured to the bucket member, and within the member 36 is arranged a weighted ball 38 which may roll freely in the tube. The outer end of the member 36 carries a suitable electric contact 39 which engages suitable contact member 40 extending from the inner back wall of the cabinet 1.

When the bucket is tilted downwardly, as illustrated in Figures 2 and 4, the ball 38 within the tubular switch holds the outward end of the switch member in a raised position so that when the bucket is swung upwardly the contact surface 39 engages the contact 40 to close the circuit to the motor and starting switch 41 mounted in front of the cabinet.

When the level of water in the cabinet rises above the entrance to the float chamber 33 the water lifts the ball 34 and carries it upward until it engages the plunger 35. It then tilts the tubular switch member and the weighted ball therein rolls toward the outer end and causes it to swing to clear the electrical contact, thereby breaking the circuit to the motor and the water supply valve.

The solenoid-operated waste valve 25 is also operated through the operation of the tubular switch 36 to allow the valve to open to allow the waste water within the bucket to flow downwardly through the waste pipe 27.

The flow of water through the spray nozzles may be continued for a suitable period after the waste pipe has been opened and the motor shut off, so that there will be a final rinsing of the dishes. Then by pressing the "Off" button in the starting switch the solenoid-operated water control valve will shut off the flow of water to the nozzles.

The lock handles may then be released to swing the bucket downwardly and open the cabinet, and in this operation a safety switch 42, arranged at the upper edge of the cabinet opening, operates to open the starter circuit so that the motor cannot be operated when the cabinet is open, nor can the water be turned on through the nozzles.

It will be noted that upon the downward swinging of the bucket to clear the rack to allow the washed dishes to be removed the tubular switch member 36 will be swung to an angular position, causing the ball therein to roll back, thus resetting the switch ready for the next operation, the float 34 being reset with the outflowing of the water through the waste pipe.

A dish-washing device such as described is extremely simple. The washing operation is very effective and the washing is carried on within a sealed compartment and all particles of food from dishes will be reduced clear of the dish-holding racks and evacuated from the bucket upon the opening of the waste valve.

All of the operating parts are co-ordinated to render the operation extremely simple and the safety of the person using the device is automatically assured, and the water supply is definitely cut off upon the release of the bucket locks and the opening of the cabinet.

What I claim as my invention is:

1. A dish-washing machine, comprising a cabinet having an opening in one side thereof, a bucket-like receptacle open at the top pivotally mounted within said cabinet and adapted to close the opening in said cabinet, a dish-holding rack rigidly mounted within the cabinet and extending into said receptacle, a shield arranged within said cabinet adapted to be engaged by said pivotal bucket to close the top thereof providing a sealed enclosure around said rack, means for directing cleaning water downwardly over the dishes in said rack, and means for evacuating the water from said bucket member.

2. In a dish-washing machine, in combination, a cabinet having an opening in the front wall thereof, a plate horizontally arranged within the cabinet spaced from the top thereof, a dish-holding rack rigidly suspended from said plate, a water receptacle movably mounted within said cabinet to close the opening therein and to enclose the rack, water spray devices extending through said top plate, means for controlling the flow of water through said spray devices, means for controlling the flow of waste water from said rack-enclosing member, water-agitating means extending within said rack, and automatic means for arresting said agitating means and evacuating the water from said enclosure.

3. In a washing machine, the combination with a cabinet, a rack extended within said cabinet, a water receptacle movably mounted to enclose said rack, electrically controlled means for spraying water over said rack into said receptacle, electrically controlled means for agitating the water within said receptacle, and electrically controlled means for evacuating the water from said receptacle, of a tubular float chamber mounted on and connected with said receptacle, a float within said chamber, a plunger operated by said float, and a pivotal switch member operated by said plunger adapted to control the operation of the electrically controlled means.

4. A device as claimed in claim 3, in which the pivotal switch member is of tubular form and extends on either side of a pivot, and a weighted ball is arranged within said tubular switch member.

5. A dish-washing machine, comprising a cabinet, a dish-holding rack mounted within said cabinet, means within said cabinet adapted to contain the dish-washing water mounted to be moved to sealably enclose said rack or permit access thereto, means located within said rack for directing washing water over the dishes contained in said rack, and means for discharging the water from said movable enclosure.

6. A dish-washing machine, comprising a cabinet having an opening in one side thereof, a dish-holding rack mounted within the cabinet, a water receptacle mounted within said cabinet and movable to close the opening therein and to enclose said rack, means for sealing the top of said receptacle when in the closed position, means extending within said sealed receptacle for directing cleansing water to contact and cleanse the dishes mounted in said rack, and means for evacuating the water from said receptacle.

7. A dish-washing machine, comprising a cabinet, a dish-holding rack suspended in said cabinet, a bucket-shaped receptacle pivotally mounted in said cabinet to swing downwardly to permit access to said rack, means for sealing the top of said bucket-shaped receptacle when in its raised position enclosing said rack, means for spraying water downwardly over said rack into the bucket, means for draining the water from the bucket, and means for agitating the water within the bucket.

8. In a dish-washing machine, the combination with a cabinet, a dish-holding rack rigidly suspended within the cabinet, a bucket movably mounted within the cabinet to enclose said rack, and means for directing water into said bucket, of electrically operated means for agitating the water within the bucket, electric contacts mounted in said cabinet connected with said electrically operated means, a switch arranged on said bucket to engage said contacts when the bucket is operated to enclose said rack, and means for automatically disengaging said switch from said contacts controlled by the level of water in the bucket.

SIDNEY G. BURT-WELLS.

REFERENCES CITED

The following references are of record in the file of this patent:

UNITED STATES PATENTS

| Number | Name | Date |
|---|---|---|
| 1,064,135 | Drummond | June 10, 1913 |
| 1,632,007 | Kehoe | June 14, 1927 |
| 1,793,798 | Harker | Feb. 24, 1931 |
| 1,917,829 | Cole | July 11, 1933 |
| 2,195,615 | Chamberlin | Apr. 2, 1940 |
| 2,102,819 | Ronci | Dec. 21, 1937 |

FOREIGN PATENTS

| Number | Country | Date |
|---|---|---|
| 30,563 | Sweden | Apr. 8, 1911 |